United States Patent [19]
Henderson et al.

[11] Patent Number: 5,515,056
[45] Date of Patent: May 7, 1996

[54] BURST TONE RANGE PROCESSING SYSTEM AND METHOD

[75] Inventors: Brian G. Henderson, Derwood, Md.; Antoine R. Naaman, Washington, D.C.; Alexándre Olimpiew, Reston; Jean-Pierre Bourgon, Herndon, both of Va.

[73] Assignee: Intelsat, Washington, D.C.

[21] Appl. No.: 103,632

[22] Filed: Aug. 11, 1993

[51] Int. Cl.⁶ .................................... G01S 13/36
[52] U.S. Cl. ................ 342/125; 342/145; 342/357; 342/458
[58] Field of Search .................... 342/125, 126, 342/127, 134, 135, 145, 189, 357, 378, 450, 451, 453, 458, 463

[56] References Cited

U.S. PATENT DOCUMENTS

| | | | |
|---|---|---|---|
| 3,604,945 | 11/1968 | Hoffman et al. | 307/518 |
| 3,763,492 | 10/1973 | Easton | 342/458 |
| 3,769,589 | 10/1973 | Buntschuh et al. | 342/100 X |
| 3,916,410 | 10/1975 | Elwood | 342/458 |
| 3,949,400 | 4/1976 | Shores | 342/356 |
| 3,988,734 | 10/1976 | Elwood | 342/464 |
| 4,140,972 | 2/1979 | Enriquez et al. | 455/68 |
| 4,276,553 | 6/1981 | Schaefer | 342/357 |
| 4,346,470 | 8/1982 | Aivarez, III et al. | 370/104 |
| 4,584,541 | 4/1986 | Nossen | 455/108 X |
| 4,628,286 | 12/1986 | Nossen | 332/100 |
| 4,675,684 | 1/1987 | Spence | 342/394 |
| 4,704,574 | 11/1987 | Nossen | 328/133 X |
| 4,809,006 | 2/1989 | Dar | 342/352 |
| 4,916,455 | 4/1990 | Bent et al. | 342/457 |
| 5,128,680 | 7/1992 | Sabato et al. | 342/60 |
| 5,150,310 | 9/1992 | Greenspun et al. | 364/516 |
| 5,160,935 | 11/1992 | Inamiya | 342/357 |
| 5,181,041 | 1/1993 | Lind et al. | 342/453 |
| 5,243,424 | 9/1993 | Emmett | 358/143 |

OTHER PUBLICATIONS

Band 26, Heft 6, Juni 1972, AEU, Archiv Fur Elektronik Und Ubertragungstechnik, Electronics and Communication, pp. 245–249.

"The New ESA Multi-Purpose Tracking System", R. DeGaudenzi et al., ESA Journal 1990, vol. 14, pp. 24–40.

Primary Examiner—John B. Sotomayor
Attorney, Agent, or Firm—Lowe, Price, LeBlanc & Becker

[57] ABSTRACT

A burst tone range processing system for determining the distance between a ranging station and a signal re-transmitting target device, generates a burst tone signal of finite duration and transmits the signal along a delay transmission path from the ranging station to the target and along a reference transmission path within the ranging station. The transmitted signals are received from the reference and delay paths and assigned time tags. The signals are then correlated and the time tags assigned to correlated signals are compared.

32 Claims, 6 Drawing Sheets

BURST TONE RANGE PROCESSING SYSTEM AND METHOD

BACKGROUND OF INVENTION

1. Field of the Invention

This invention relates to range processing systems and methods and more particularly to systems and methods for determining the range of a signal retransmitting target device such as a communications satellite.

2. Description of the Related Art

Control of communication satellites and other target devices which are capable of receiving and retransmitting ranging signals requires that the location of the target be known. The distance or slant range between the ranging station antenna and the target is one factor in determining the location of the target. Conventional ranging systems used for determining this distance can be characterized as either pulse or continuous wave type systems.

Pulse type systems determine the range of the target device directly by measuring the time required for a short pulse signal to be transmitted to the target and retransmitted back to the transmitting station. In a typical pulse system, a reference clock counter is started at the time of transmission of a pulse signal to the target device. When the pulse signal is returned to the transmitting station the counter is turned off. The count stored in the counter multiplied by the duration of each cycle of the reference clock is a measure of the delay.

More elaborate pulse type systems exist where the frequency is varied over the duration of the pulse. Such systems utilize a chirp pulse wherein the frequency of a wide bandwidth pulse is swept up or down over the duration of the pulse. The system's receiver is matched to the frequency sweep of the transmitted pulse so that the counter is turned off based upon the correlation of the transmitted and received pulse at frequency transition points. Another type of pulse system uses a (pseudo) random sequencing, such as a random binary code, to modulate the phase of the pulse. The phase coded pulse returned from the target is correlated against a replica of the code. The counter is stopped when a replica of the transmitted binary code sequence correlates to the binary code sequence of the received signal. Use of the conventional pulse type systems with target devices having signal bandwidth limitations is generally unacceptable because the degradation of the retransmitted limited bandwidth pulse results in poor ranging measurement accuracy.

Present continuous wave (CW) or range tone systems transmit a continuous signal to the target device over an extended period of time. The signal retransmitted from the target device to the ranging station is phase compared to the transmitted CW signal. The phase difference between the transmitted and received signals is utilized in determining the target range.

The use of a single frequency CW signal is not suitable for ranging over long distances since a multiple wavelength ambiguity is introduced when using the phase to determine the target range. Various techniques have been developed to improve the suitability of continuous wave systems for ranging purposes. One such technique is to transmit multiple tones of different frequency to resolve this ambiguity.

Careful choice of sequentially higher frequencies will enable the range accuracy to be improved while maintaining ambiguity resolution. However, CW systems must have prior knowledge of the estimated target range within the ambiguity resolution of the lowest frequency tone in order to be utilized. Furthermore, CW systems which use multiple tones require added time for range determination and therefore may provide poor ranging accuracy for fast moving target devices.

Both conventional pulse type and CW systems require that all ranging station components along the transmit and receive paths of the ranging signals be pre-calibrated for signal delay, and therefore any degradation or change in the components between the time of calibration and the time of actual range measurement will affect the accuracy of the measurement.

Thus, it is an object of the present invention to provide a system and method for accurately determining the range of a signal retransmitting target device with significant signal bandwidth restrictions. It is a further object of the present invention to provide a ranging system and method which does not require prior knowledge of the approximate target range. It is additionally an object of the present invention to provide a system and method for accurately determining the range of a fast moving target device. A still further object of the present invention is to provide a system and method which minimizes range determination error caused by pre-calibration of ranging station components.

While the present invention is described below with reference to a preferred embodiment for ranging to a geo-stationary communications satellite, it should be understood that the invention is not limited thereto. Those of ordinary skill in the art having access to the teachings herein will recognize additional applications, modifications and embodiments within the scope of the present invention as disclosed and claimed herein and additional fields in which the present invention would be of significant utility.

SUMMARY OF THE INVENTION

In one embodiment of the invention, a range processing system for determining the distance between a ranging station and a signal retransmitting target device comprises a signal generator which generates a burst tone signal of finite duration. A transmitter transmits, on a carrier, the generated signal along a delay transmission path from the ranging station to the target device and along a reference transmission path within the ranging station. A receiver receives the transmitted signals from the target device and from the reference transmission path and assigns time tags to the received signals. A time comparator correlates the received signals and compares the time tags assigned to the respective correlated signals.

In the preferred embodiment, the system also has a processor, such as a personal computer, for computing the distance between the ranging station and the target device based upon the time tag comparison. It is also preferable for the reference and delayed signals to be transmitted simultaneously and for the ranging system to include a translator, with known delay characteristics, located on the reference transmission path for translating the reference signal carrier to a receiver frequency.

The generated burst tone signal is preferably sinusoidal and comprised of a preamble and a ranging tone. The preamble should typically be of at least two frequencies which are interleaved multiple times. The ranging tone is preferably of a single frequency equal to one of the preamble frequencies. In the preferred embodiment, the interleaved frequencies within the preamble transition at zero crossings of the sinusoidal. The ranging tone immediately follows the preamble and transitions from the preamble at a zero crossing of the sinusoidal. Each zero crossing of the received sinusoidal signals is time tagged.

The correlation between the received reference and delay path signals is preferably determined based upon the sum of the root mean square differences between the corresponding periods of the respective received preambles. Preferably, the distance between the ranging station and the target device is determined using the average difference between the corresponding time tags assigned to each zero crossings of the respective correlated ranging tone signals. The preferred ranging system has a filter with a bandwidth approximately equal to the spectral power content of the preamble of the pulse tone signal.

In a second embodiment of the invention, a ranging system for determining the distance between a ranging station and a signal retransmitting target device, comprises a signal generator which generates two identical burst tone signals of finite duration. A transmitter transmits one of the two burst tone signals along a delay transmission path from the ranging station to the target and along a reference transmission path within the ranging station and, after a time delay equal to no less than twice the maximum distance between the ranging station and the target device divided by the speed of light, transmits the other of the two burst tone signals along the delay transmission path and along the reference transmission path. A receiver receives the transmitted signals from the target device and the reference transmission path and assigns time tags to the received signals. A data storage device, such as a random access memory, stores at least a portion of the time tags assigned to the first signal received from the target and the last signal received from the reference path, or preferably the last signal received from the target and the first signal received from the reference path. A time comparator correlates the first signal received from the target and the last signal received from the reference path, or alternatively the last signal received from the target and the first signal received from the reference path, and compares the corresponding stored time tags assigned to the correlated signals.

Preferably the ranging system also comprises a processor, such as a personal computer, for computing the distance between the ranging station and the target device based upon the time tag comparison.

Another aspect of the invention is a method for determining the distance between a ranging station and a signal retransmitting target device, comprising the steps of generating a burst tone signal of finite duration and transmitting the signal on a carrier along a delay transmission path from the ranging station to the target device and along a reference transmission path within the ranging station. The transmitted signals are received from the target device and the reference transmission path and assigned time tags. The received signals are correlated. The corresponding time tags of the respective correlated signals are then compared.

Preferably, the ranging method further comprises the step of computing the distance between the ranging station and the target device based upon the time tag comparison. It is also preferable to transmit the reference and delayed signals simultaneously and to translate the signal carrier transmitted over the reference path to a receiver frequency in such a way that the translation produces a known signal delay.

The preferred burst tone signal is sinusoidal and is comprised of a preamble and a ranging tone. The preamble is comprised of at least two frequencies which are interleaved multiple times within the preamble. The ranging tone is comprised of a single frequency equal to one of the preamble frequencies. Preferably the interleaved frequencies within the preamble transition at zero crossings of the sinusoidal. The ranging tone immediately follows the preamble and similarly transitions from the preamble at a zero crossing of the sinusoidal. Each zero crossing of the received sinusoidal signals is time tagged.

The correlation between the received reference and delay path signals is preferably determined based upon the sum of the root mean square differences between the corresponding signal periods of the respective received preambles. The distance between the ranging station and the target device is best determined using the average difference between the corresponding time tags assigned to each zero crossings of the respective correlated ranging tone signals. Filtering the received signals is preferably done through a filter with a bandwidth approximately equal to the spectral power content of the preamble of the pulse tone signal.

Another aspect of the invention is a method for determining the distance between a ranging station and a signal retransmitting target device, comprising the steps of generating two identical burst tone signals of finite duration and transmitting one of the two burst tone signals along a delay transmission path from the ranging station to the target device and along a reference transmission path within the ranging station. After a time delay equal of no less than twice the maximum distance between the ranging station and the target device divided by the speed of light is introduced, the other of the two burst tone signals is transmitted along the delay transmission path and along the reference transmission path. The transmitted signals are received from the target device and from the reference transmission path and assigned time tags. At least a portion of the time tags assigned to the first signal received from the target and the last signal received from the reference path, or preferably the last signal received from the target and the first signal received from the reference path, are stored. The first signal received from the target and the last signal received from the reference path, or alternatively the last signal received from the target and the first signal received from the reference path, are correlated and the corresponding stored time tags assigned to the correlated signals are compared. Preferably, the ranging method further comprises the step of computing the distance between the ranging station and the target device based upon the time tag comparison.

DESCRIPTION OF THE PREFERRED EMBODIMENT

Figure 1:
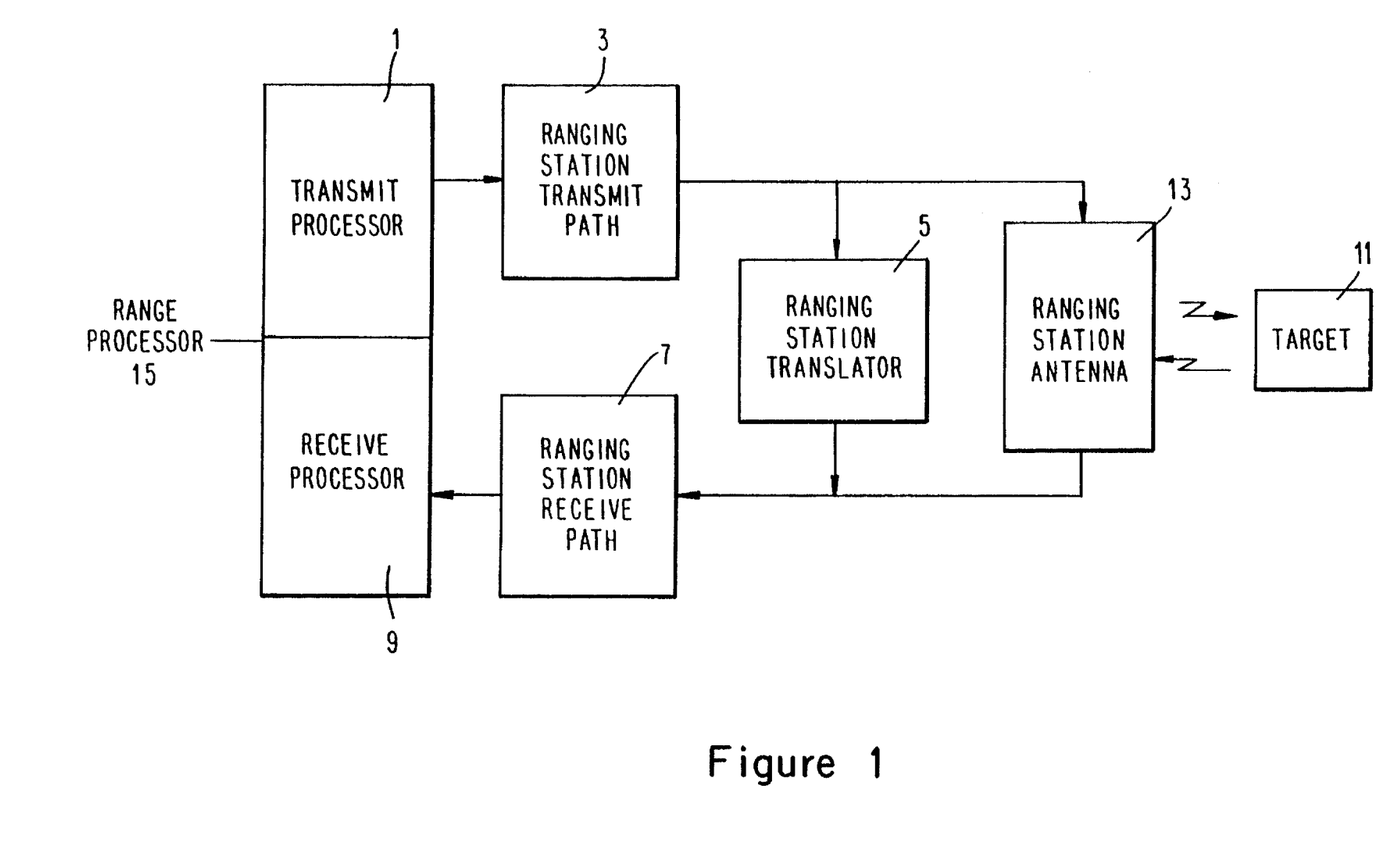
FIG. 1 is a block diagram of an embodiment of the invention.

FIG. 1 is a diagram illustrating the burst tone range processing system of the present invention. Transmit processor 1 generates, modulates onto a carrier and transmits a burst tone signal along the ranging station transmit path 3. The transmitted signal is split and transmitted over a reference path through the ranging station translator 5 to the ranging station receive path 7 and is received by the ranging station receive processor 9. The split signal is also transmitted over a delay path to the target 11 via the ranging station antenna 13. Transmission of the signals along the reference and delay paths preferably occurs simultaneously but could occur at different times so long as the interval between transmission of the respective signals is known.

After retransmission from the target the delayed signal is received by the ranging station antenna 13 and transmitted over the ranging station receive path 7 to receive processor 9. The target 11 is a active repeater, such as a communication satellite, which is capable of receiving and retransmitting the delayed burst tone signal. The target 11 is typically capable of amplifying and translating the frequency of the signal prior to retransmission back to the ranging station. The ranging station translator 5 is located immediately prior to the ranging station antenna 13. Its function is to translate the transmitted reference burst tone signal to a frequency compatible with the ranging station receive processor 9.

The carrier frequency of the reference burst tone signal after translation by the translator 5 will be normally be offset from the carrier frequency of the delayed burst tone signal retransmitted from the target so as to maintain frequency separation between the reference and delayed burst tone signals in the receive path 7. The generated burst tone signal could be used as the reference signal by the receive processor 9 without being transmitted through the ranging station transmit and receive paths 3 and 7, thereby eliminating the need for translator 5. However, under this approach additional calibration of the ranging station components would be required.

The receive processor 9 recovers and determines the time interval between the reference and delayed burst tone signals. This time interval can be used to compute the range to the target in the conventional manner preferably with the aid of a personal computer. Since both the reference and delayed signals propagate through the ranging station, most of the time delay caused by the station is automatically calibrated out. This removes much of the uncertainty normally caused by the signal delay variations in the ranging station transmit and receive paths (3 and 7 respectively). Fixed delay constants still need to be removed from the ranging calculation for delays occurring in the target and in the ranging station components between the translator 5 and the ranging station antenna 13, and in the translator 5 itself.

Figure 2:
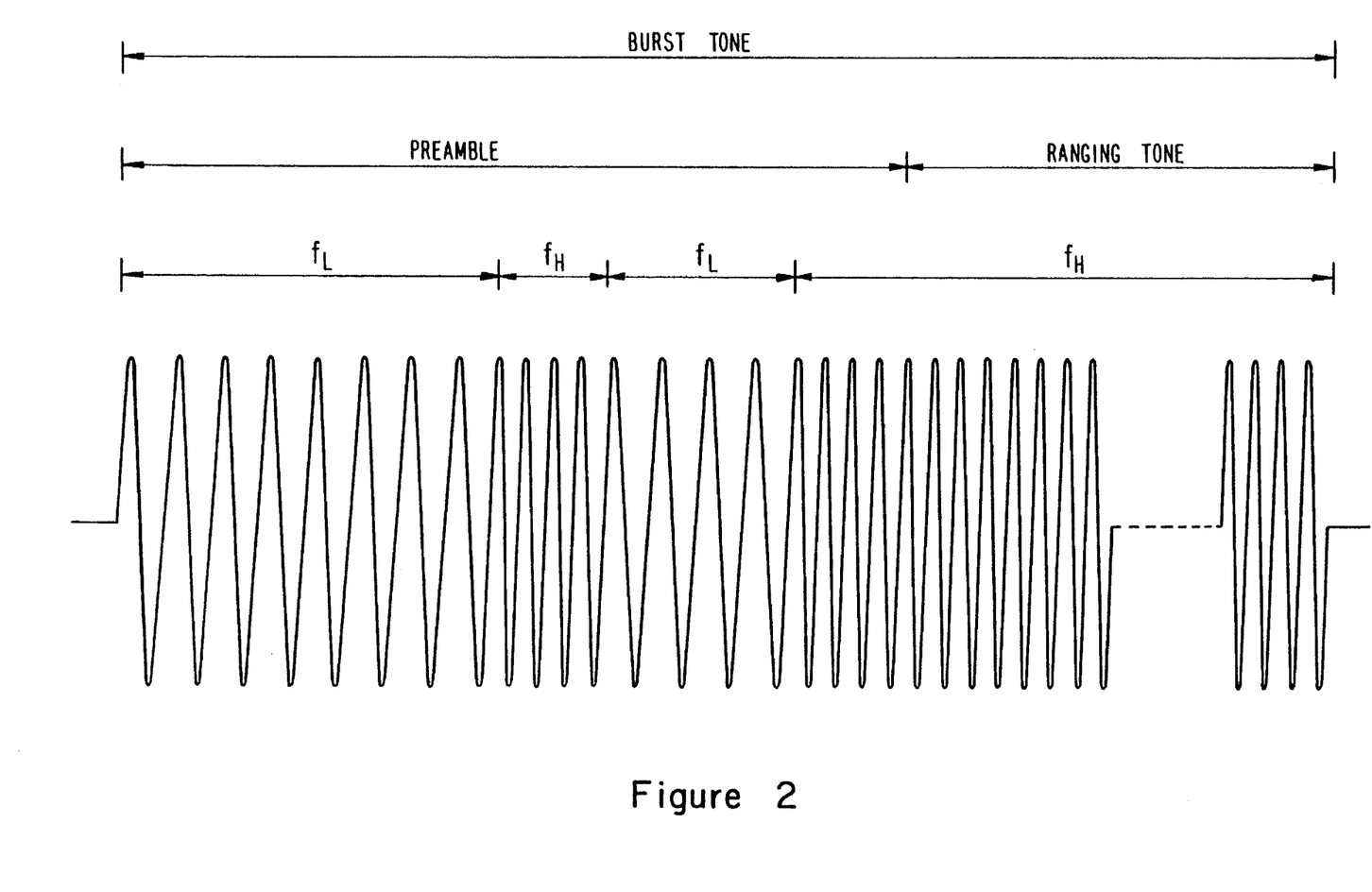
FIG. 2 is a diagram of a burst tone signal in accordance with the invention.

FIG. 2 is a diagram illustrating the general format of the burst tone signal generated by transmit processor 1 of FIG. 1. The burst tone signal consists of two parts which are referred to as the preamble and ranging tone. The composition of the preamble facilitates the determination of the time delay in the delayed signal without having to rely on the start (leading edge) of the burst tone signal. By using the preamble, the distortion introduced at the start of the burst by the bandwidth restrictions in the target 11 and receive processor of 9 of FIG. 1 has virtually no effect on the range determination.

Although other selective filtering may occur to the delayed signal alone while being processed by the target, by performing the most significant filtering in the receive processor 9 of FIG. 1 ensures that both the reference and delayed burst tone signals incur almost identical signal shaping. The transmitted preamble consists of at least two distinct frequencies ($f_L$ and $f_H$) that are interleaved multiple times. Switching from one frequency to another preferably occurs at the zero crossing points, so there is a relatively smooth phase transition between them.

It will be recognized by those skill in the art that the preamble frequencies could be interleaved only one time if desired and that the frequency transitions could occur at other than the zero point crossings. The receive processor passband filter bandwidth is matched to the spectral power content of the preamble (i.e., filter bandwidth approximately equals $f_H$ minus $f_L$). By utilizing such a filter bandwidth, only a small amount of the signal power in the preamble occurring at the transitions is outside the receive processor passband. The envelope of the preamble is therefore not excessively distorted or attenuated by the filtering. The filter in the range processor does have some impact on phase shift in the preamble because of the effectively smooth transition between the preamble frequencies.

The transitions between the two preamble frequencies will occur over a time duration approximately proportional to the inverse of the filter bandwidth. Thus a frequency sweeping effect, at the zero crossing intervals where frequency transitions occur, is introduced in the preambles of both the reference and delayed signals as the frequencies are changed back and forth from $f_L$ to $f_H$. This sweeping effect could, if desired, be introduced by frequency sweeping the transmit processor 1 of FIG. 1 rather than through the filtering. The frequency transitioning provides unique time dependent characteristics to the zero crossing points that enable the preambles of the reference and delayed signals to be compared and all zero crossing points to be time stamped or tagged by receive processor 9 of FIG. 1 and then correlated or lined up also by processor 9.

The line-up reflects the best match between corresponding time tagged zero crossing points in the reference and the delayed preambles. When preambles of the reference and delayed signals are lined up, each zero crossing in the delayed signal can be matched to a corresponding zero crossing in the reference signal. The line-up can be achieved by making repeated estimates of the best match of corresponding periods between positive and negative going time tagged zero crossing points of the reference and delayed preambles using a root mean square of the differences analysis.

The accurate determination of the ranging distance is based upon the use of a single frequency ranging tone for the second part of the burst tone signal. Higher frequencies in the preamble and the ranging tone offer an advantage in that they allow for more zero crossings within the same burst tone signal duration. The zero crossings of the ranging tones of both the delayed and reference signals are accurately time stamped by the receive processor 9 of FIG. 1 so that the time difference between corresponding zero crossings can be used to accurately calculate the round trip delay of the burst tone signal from the ranging station to the target and hence the range of the target. The reference signal will normally be received with a relatively high signal to noise ratio since the propagation loss through the ranging station can be maintained relatively low. On the other hand, the delayed signal is normally received with a relatively low signal to noise ratio and thus the zero crossings of the delayed signal are significantly perturbed by noise. The signal time delay and target range estimate provided by the time difference between only one pair of matched zero crossing points is therefore not very accurate.

Hence, the range processing system of the present application takes advantage of the multiple zero crossings of the received signals. The difference between each pair of corresponding zero crossings in the ranging tone portion of the reference and delayed signals provides an estimate of the delay. Averaging all of these estimates provides improved accuracy proportional to the number of independent zero crossing points utilized in determining the signal time delay or range. On a statistical basis this averaging provides an improvement in the accuracy based upon the number of individual estimates which are statistically independent.

In the range processing system of this application the use of filtering in the receive processor limits the amount of noise perturbation at the zero crossings, but also introduces some statistical correlation among adjacent zero crossings. This correlation is due to the response time of the filter. From an analytical perspective the auto-correlation function of the filter has non-zero values in multiples of the tone period. Practically, this means that any noise perturbations at the input to the filter effects a number of the burst tone signal zero crossing points so that the jitter is not independent among adjacent crossings. Reducing the receive processor filter bandwidth reduces the jitter that noise introduces to a single zero crossing point. However, for any given burst tone signal duration this does not improve the measurement accuracy since there is an accompanying reduction in the number of independent zero crossing points. By averaging the time difference between multiple pairs of corresponding zero crossing points in the ranging tone portion of the received signals after filtering, the effect of jitter can be reduced in proportion to the number of corresponding pairs of zero crossing points which are averaged.

The contribution of the propagation delay in the target and the ranging station components between the translator and ranging station antenna (respectively 5 and 13 of FIG. 1) as well as in the translator 5 itself must be included in the computation of signal time delay between the ranging station and the target. These contributors to propagation delay can be more accurately determined for a single frequency ranging tone than for a multiple frequency ranging tone.

Figure 3:
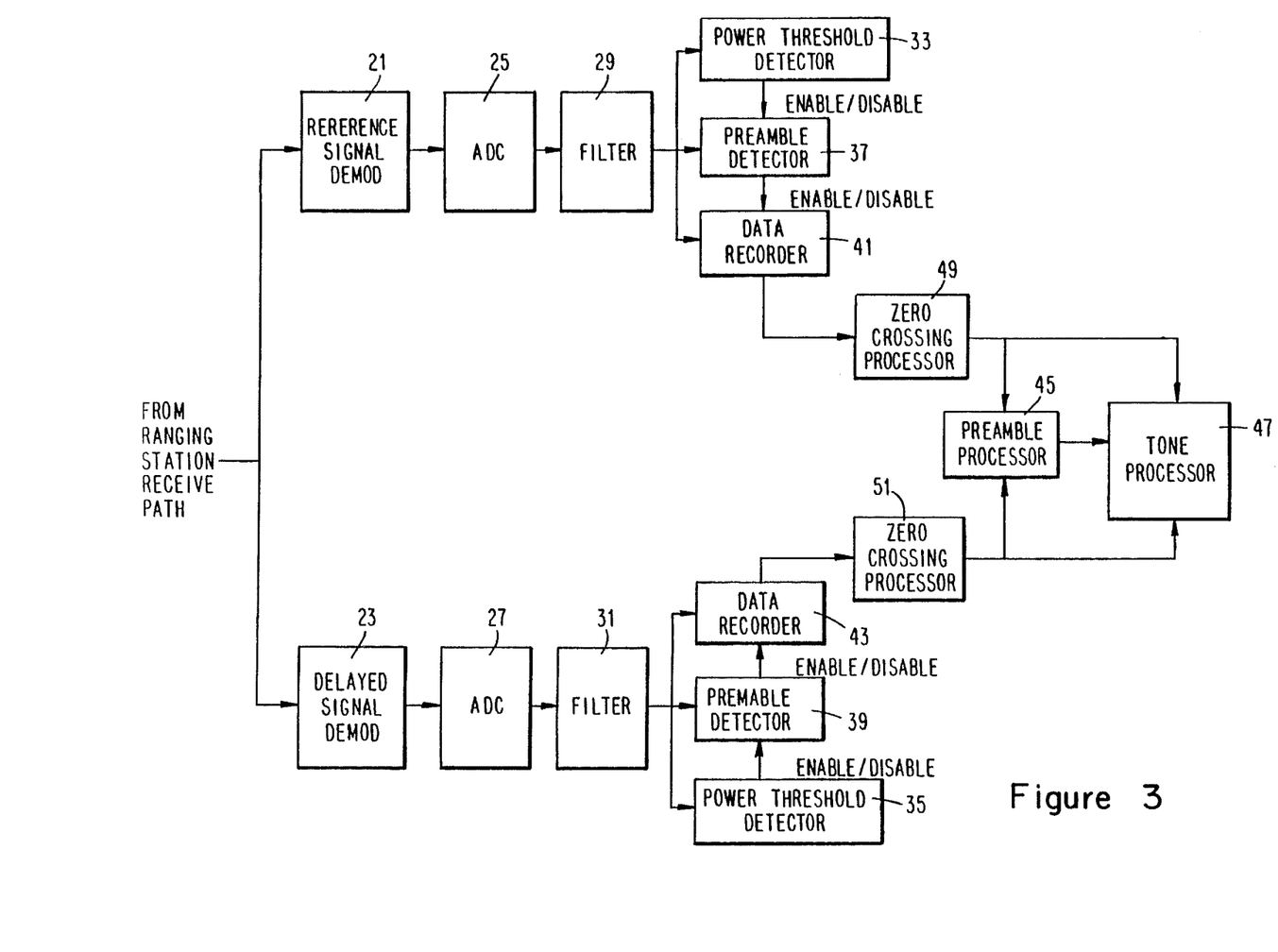
FIG. 3 is a block diagram of a receive processor in accordance with the invention.

FIG. 3 is a diagram of the receive processor 9 of FIG. 1 implemented using digital signal processing technology for all base-band processing. The receive processor could also be implemented using analog processing techniques up to and including the recording of the zero crossing data. The receive processor receives the reference and delayed signals from the ranging system receive path 7 of FIG. 1. The signals are demodulated by demodulators 21 and 23, as applicable, and sampled respectively by analog to digital convertors 25 and 27. The analog to digital conversion sampling rate should not be harmonically related to the frequency of the received signal being processed so as to avoid bias in the signal delay determination which could occur if the data from the sampling is obtained at the same points for every signal period. The analog to digital converters 25 and 27 should have a sampling clock with an accuracy sufficient to avoid contributing unacceptable error to the range determination.

After conversion, the signals are respectively filtered in filters 29 and 31 each of which have a filter bandwidth approximately equal to the spectral power content of the preamble of the applicable received signal. The filtering limits the bandwidth of the received signals and reduces interference from unwanted noise and other signals such as telemetry subcarriers. To avoid unnecessary processing of the signals, power threshold detectors 33 and 35 are used to detect the estimated start of the respective received signals. Preamble detectors 37 and 39 then verify the start of the respective signals before further processing.

After verification, data collected from both sides of the zero crossing points of the respective signals during signal sampling by the analog to digital converters 25 and 27 is recorded by the applicable zero crossing data recorder 41 or 43. All processing up through the recording of this data is preferably undertaken in real time. After the data has been recorded for the received reference and delayed signals the remaining signal processing may be performed on a non-real time basis.

Because the recorded data will not necessarily represent the exact zero crossing points of the received signals, interpolation of the data on either side of the nominal zero crossing point is used by zero crossing processors 49 and 51 to calculate and store the zero crossing point time tags of the respective received reference and delayed signals. A sample rate of at least eight times the signal frequency facilitates the use of linear interpolation to provide an accurate estimate of the zero crossing time.

Figure 4:
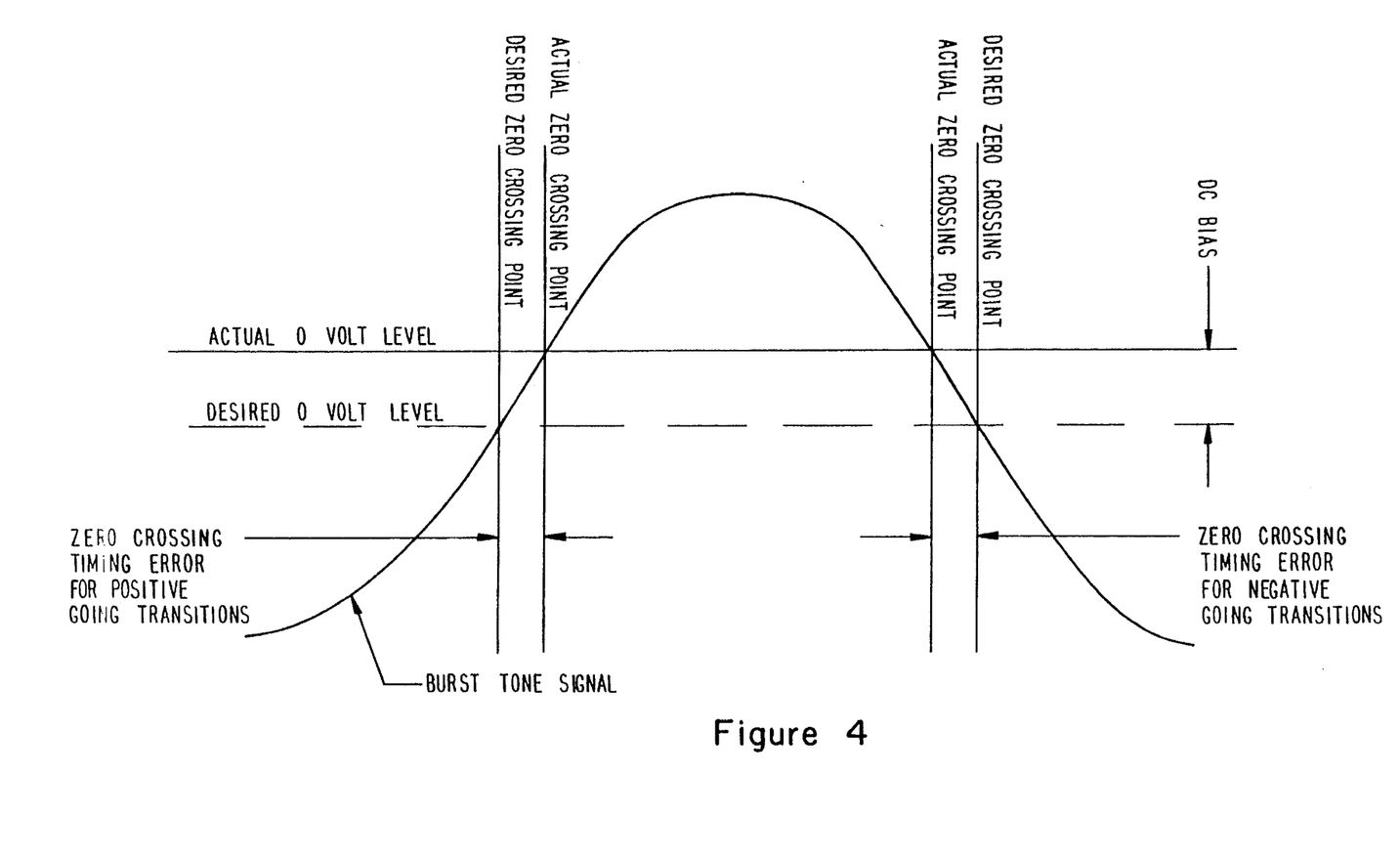
FIG. 4 is a diagram illustrating the affect of dc bias on the signal zero crossing points in accordance with the invention.

The analog circuitry within the receive processor 9 of FIG. 1 may introduce dc bias in the received signals which will cause a corresponding time bias in the zero crossing points. To address this problem, the zero crossing time for both positive and negative going zero crossing transitions of the received signals are utilized in determining the signal time delay. As shown in FIG. 4, the positive and negative going transitions have equal but opposite time error due to dc bias. By averaging the zero crossing times, the bias error in the positive and negative going transitions will cancel each other.

Referring again to FIG. 3, the stored preamble time tags are used for correlating or lining up the reference and delay signals in the preamble processor 45 by matching the respective preamble signal periods using the zero crossing time tag differences. Once line-up has been achieved, the tone processor 47 accurately determines the signal round trip delay to the target by comparing each zero crossing time tag in the ranging tone portion of the received delayed signal with the corresponding zero crossing time tag in the ranging tone portion of the received reference signal. The time differences in the corresponding ranging tone zero crossing time tags are averaged by the tone processor to determine the delay in the signal transmitted to the target.

Figure 5:
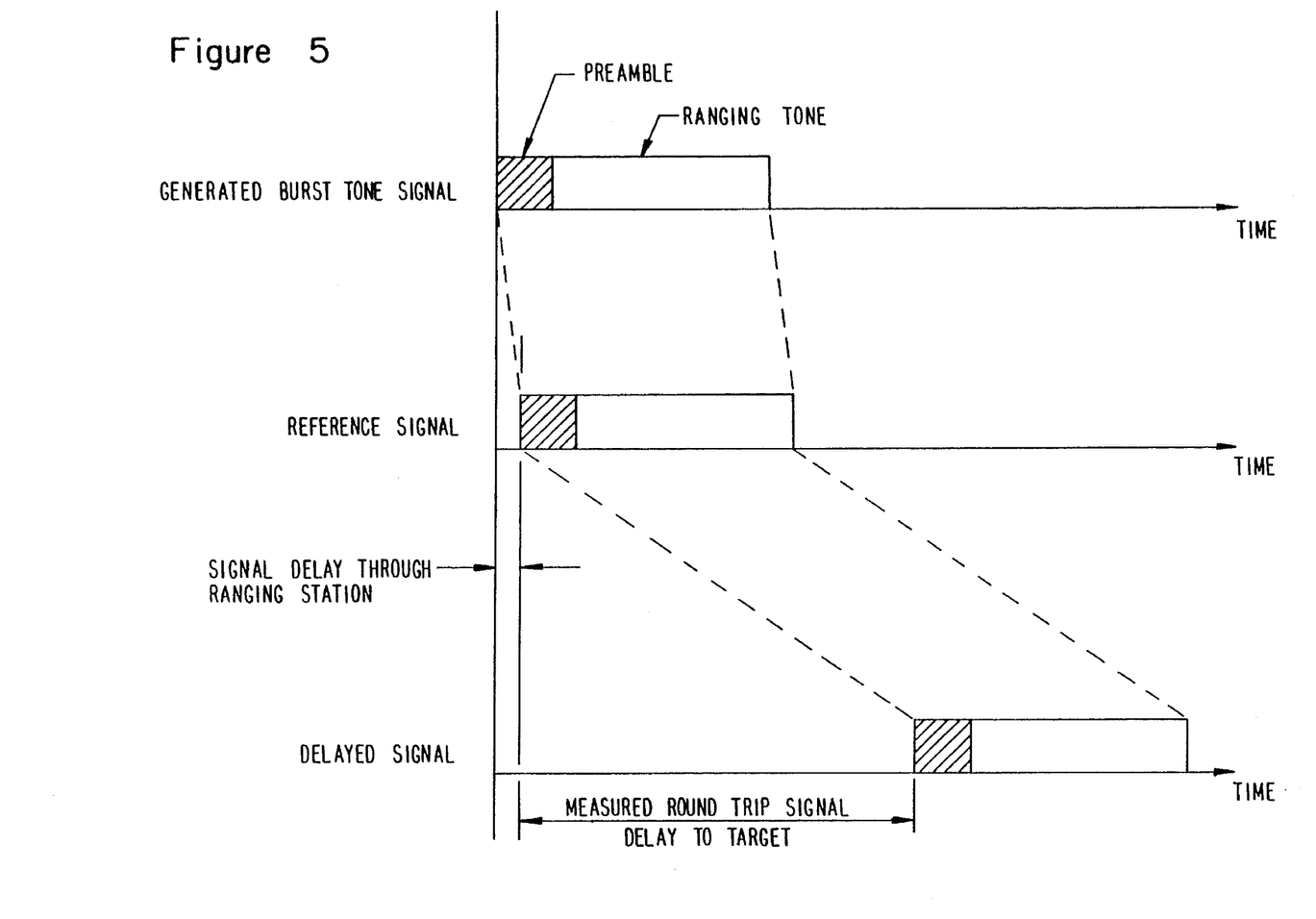
FIG. 5 is a diagram providing an exemplary illustration of burst tone signal delay measurement in accordance with one embodiment of the invention.

FIG. 5 illustrates one of a number of possible formats for the transmitted and received burst tone signals in accordance with the present invention. It is preferable for the burst tone signal duration to be less than the round trip signal delay to and from the target device. For example, in the ranging of geostationary communications satellites a signal duration of 240 msec is preferred. If the round trip signal delay is less than the burst tone signal duration and a single burst is used, the receive processor must perform all real time processing simultaneously on both the received reference and delayed signals in parallel.

Figure 6:
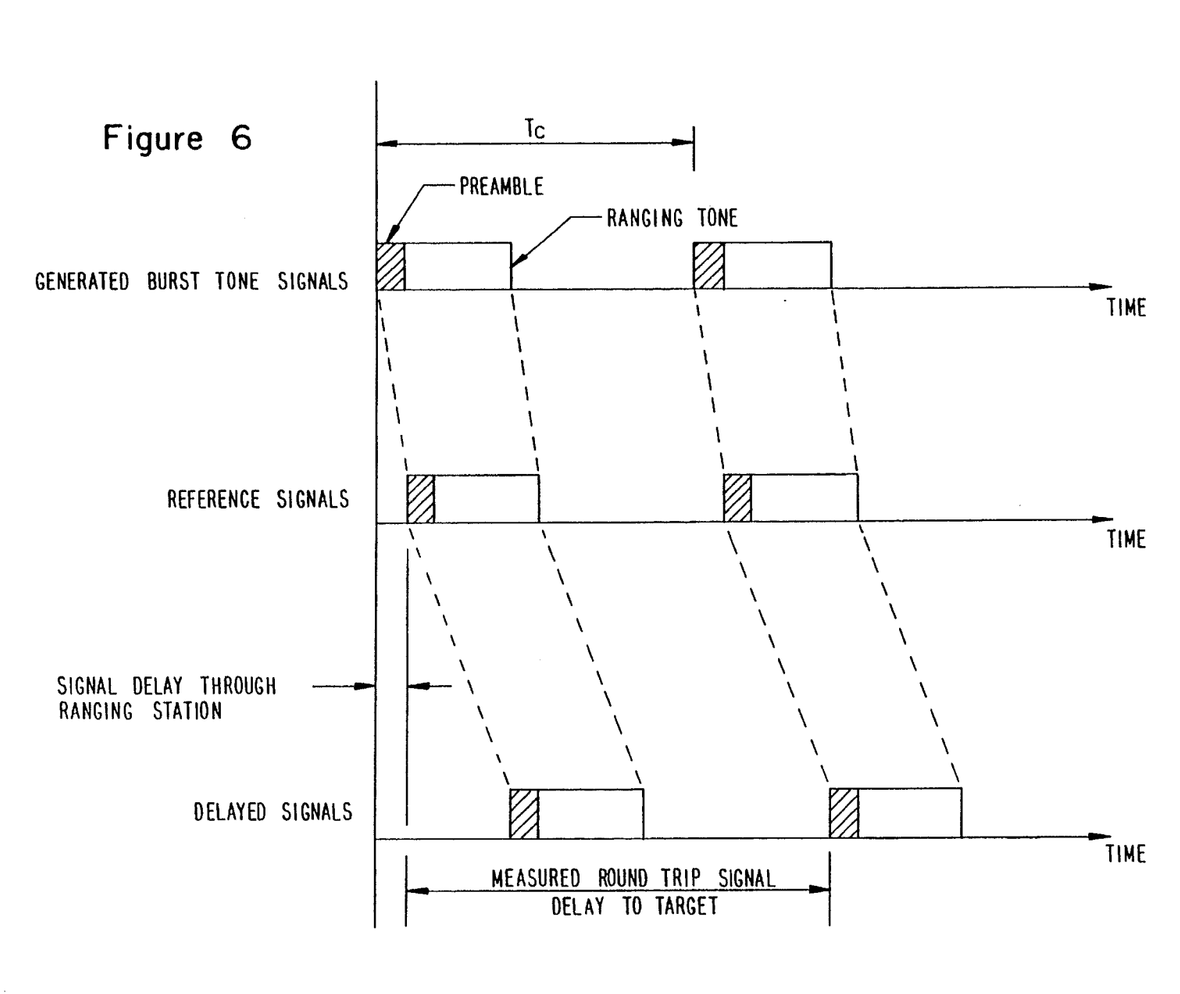
FIG. 6 is a diagram providing an exemplary illustration of burst tone signal delay measurement in accordance with another embodiment of the invention.

FIG. 6 illustrates the use of two identical burst tone signals where the interval $T_c$ between the transmission of the first and second signals is known. $T_c$ is chosen to be longer than the maximum possible round trip delay of the signal between the ranging station and the target. The receive processor time tags the first received reference signal and the last received delayed signal or visa versa. This allows the receive processor to undertake real time processing on only a single received signal at a time. The computation of the delay between the first reference signal and the second delayed signal takes into account the interval $T_c$.

Those familiar with ranging systems will appreciate the following derivations relating to determination of the ranging distance and ranging errors. The derivations assume that correlation or line-up of the reference and delayed signals, using the preambles, has already been accomplished. Actual range determination results for geostationary communications satellites using the present invention are comparable to those using the following formulas.

The ranging tone portion of the reference burst tone signal can be defined as $$r(t) = rect\left(\frac{t - T/2}{T}\right) A_c \sin(2\pi f_c t), \quad (1)$$

where, T is the duration of the ranging tone. It is assumed that r(t) is received under high SNR (signal-to-noise) conditions compared with the delayed burst tone, hence it is assumed that any noise on r(t) is insignificant.

The delayed ranging tone will be $$d(t) = r(t - 2\tau) + n(t), \quad (2)$$

where $\tau$ is the propagation delay to the target. The delay through the target is not included in this equation, since it will be a known constant that is readily subtracted. Thus the range to the target is given by $$r = v\tau \text{ meters}, \quad (3)$$

where $v$ is the velocity of light in free-space. n(t) is the noise at the output of the receive processor filter, and is assumed to result from additive white Gaussian noise (AWGN) $N_0$ at the filter input.

After undergoing zero-crossing detection, each positive and negative going edge event is measured (time-tagged). Such an event for the reference ranging tone can be represented as $$\tau_r(m) = \begin{cases} \tau_{r_{bias}}(m_+), \text{ for } +ve \text{ going edges} \\ \tau_{r_{bias}}(m_-), \text{ for } -ve \text{ going edges} \end{cases} \quad (4)$$

where m refers to the mth zero-crossing event, and $m_+$ and $m_-$ refer to the event associated with the positive and negative going edges, respectively. The reason for differentiating between the positive and negative relates to a practical implementation requirement, where it is not possible to completely remove any dc bias voltage at the input to the zero-crossing detector. The zero-crossing events in equation (4) therefore take into account a bias.

The positive and negative zero-crossing events can be represented respectively as:

$$\tau_{r_{bias}}(m_+) = \tau_r(m_+) + \Delta_{dc+} \quad (5)$$

and $$\tau_{r_{bias}}(m_-) = \tau_r(m_{31}) + \Delta_{dc-}. \quad (6)$$

where $\tau_r(m_+)$ and $\tau_r(m_{31})$ are the correct zero-crossing points and, $\Delta_{dc+}$ and $\Delta_{dc-}$ are time offset errors caused by the dc bias. The positive and negative sinusoidal zero-crossing points have opposite slope, hence the values of $\Delta_{dc+}$ and $\Delta_{dc-}$ will be equal but opposite. Since, as will be shown, the computation of range uses averaging of the zero-crossing events, mutual cancellation of the positive and negative bias errors occurs. Thus, the dc bias errors will have no net effect and can be ignored.

The corresponding zero-crossing on the delayed ranging tone can therefore be defined as $$\tau_d(m) = \tau_r(m) + 2\tau + \tau_e(m), \quad (7)$$

where $\tau_e(m)$ is the time error in measuring corresponding zero-crossing events in the delayed ranging tone due to the presence of noise. As with the reference ranging tone, the effect of dc bias on the delayed ranging tone zero-crossings is negated by the averaging of positive and negative going edge samples.

Each pair of corresponding zero-crossing time-tags in the reference and delayed tones provide an estimate of the delay to the target. If there are M zero-crossing events in each of the reference and delayed ranging tone signals, the delay to the target is computed as $$\tau = \sum_{m=1}^{M} (\tau_d(m) - \tau_r(m))/(2M), \quad (8)$$

where the factor of 2 in the denominator provides the one-way delay from the round-trip data.

Substituting for $\tau_d(m)$ from equation (7), reduction (8) reduces to $$\tau = \tau + \sum_{m=1}^{M} \frac{\tau_e(m)}{2M}. \quad (9)$$

The second term in equation (9) introduces error to the computation of $\tau$, the delay to the target, and hence into the computation of the range. The following derives the extent of the error contributed by this second term.

Consider the occurrence of a single zero-crossing event for the noise impaired delayed ranging tone as given in equation (7). At or near a zero-crossing (t=0 can be used without loss of generality), a sinusoid can be approximated by a linear function:

$$A_c \sin(2\pi f_c t)|_{t \to 0} \approx A_c 2\pi f_c t, \quad (10)$$

Thus the form of the noise impaired sinusoid about a zero-crossing can be approximated as $$z(t) = A_c 2\pi f_c t + n(t). \quad (11)$$

At the zero-crossing point, equation (11) reduces to $$0 = A_c 2\pi f_c t + n(t). \quad (12)$$

or $$t = \frac{-n(t)}{A_c 2\pi f_c}, \quad (13)$$

where t is the time corresponding to the uncertainty or error in a zero-crossing event; this is $\tau_e(m)$ in equations (7) and (9). Thus (13) can be redefined as $$\tau_e(m) = \frac{n(t)}{A_c 2\pi f_c} \bigg|_{t = time\ of\ zero-crossing\ event\ m} \quad (14)$$

The term n(t) is zero mean Gaussian noise, where its power is defined by its statistical variance:

$$\text{noise power} = \overline{(n(t)^2)} = \sigma_n^2. \quad (15)$$

Equation (14) shows the term $\tau_e(m)$ is related to n(t) by a multiplicative constant.

Since n(t) is a Gaussian random variable, $\tau_e(m)$ will also be a Gaussian random variable with variance[1]:

$$\sigma_{\tau_e}^2 = \frac{\sigma_n^2}{(A_c 2\pi f_c)^2}. \quad (16)$$

[1] J. M. Wozencraft & I. M. Jacobs, Principles of Communication Engineering, John Wiley & sons 1965, pp 60-61.

Noting that the signal power at the output of the receive processor filter for the delayed tone is given by $$\text{power of tone-pulse} = \frac{A_c^2}{2}, \quad (17)$$

then the SNR of the delayed signal ranging tone at the output of the receive processor filter is given by $$SNR = \frac{A_c^2}{2\sigma_n^2}. \quad (18)$$

Substituting equation (18) into (16) gives the variance of the time samples with respect to the SNR at the filter's output:

$$\sigma_{\tau_e}^2 = \frac{1}{8(SNR)(\pi f_c)^2} \quad (19)$$

When the target is a communications satellite, it is typical for the satellite ranging downlink to use phase modulation (PM) for the ranging signal. The variance of the time samples may then be referred to the $C/N_o$ of the RF (radio frequency) carrier received by the ranging antenna by using the relationship $$SNR = \frac{CA_c^2}{2N_oB} \quad (20)$$

where B is the receiver processor's equivalent noise bandwidth.

The relationship between SNR and $C/N_o$ is derived from the performance of the PM demodulator prior to the receive processor. The derivation is based on $A_c$ being the PM modulation index of the ranging subcarrier. Using equations (19) and (20), the variance of each time sample can be defined as $$\sigma_{\tau_e}^2 = \frac{N_o}{C} \times \frac{B}{(A_c 2\pi f_c)^2}. \quad (21)$$

Referring to equations (8) and (9); these effectively show that $\tau$ is estimated by averaging repeated measurements over M zero crossing events. If all the zero-crossing events were statistically independent, the variance after averaging over M samples would be reduced by the factor M compared with that of a single event. This, however is not the situation due to the presence of the filter in the receive processor. Equation (9) shows that the one-way delay to the target is derived by averaging over the M corresponding zero-crossings that are measured in each of the reference and delayed tones. The result consists of the desired value $\tau$ perturbed by the noise induced zero-crossing errors. The value $\tau$ is a constant, so the variance of the one-way time delay is determined by the second term:

$$\sigma_\tau^2 = \text{variance}\left[\sum_{m=1}^{M} \frac{\tau_e(m)}{2M}\right]. \quad (22)$$

W. B. Davenport, Jr & W. L Root, An Introduction to the Theory of Random Signals and Noise, McGraw-Hill 1958, pp. 77–79

The variance can be expressed as[2]

$$\sigma_\tau^2 = \frac{1}{4M^2}\left[\sum_{q=1}^{M}\sum_{r=1}^{M} E[\tau_e(q)\tau_e(r)]\right], \quad (23)$$

where it is reasonably assumed that $\tau_e(m)$ has zero-mean.

With ranging receiver filtering, the noise which perturbs the delayed tone zero-crossing points will be correlated among several adjacent zero crossing points. To approximate the extent of this correlation it will be assumed that the response time of the receive processor filter has significant output for a duration of 1/B seconds, where B=equivalent noise bandwidth of ranging receiver filter (24)

In a practical system $$B < f_c \quad (25)$$

to reduce the amount of noise at the input to the receive processor. Thus, given that both positive and negative zero-crossings are measured, the number of adjacent zero-crossings that will be assumed to be highly correlated is $$\frac{2f_c}{B}. \quad (26)$$

With reference to equation (23), for highly correlated zero-crossing points:

$$E[\tau_e(q)\tau_e(r)] = E[\tau_e^2], |q-r| \leq \frac{2f_c}{B}, \quad (27)$$

and for uncorrelated zero-crossing points (outside the filter's response time):

$$E[\tau_e(q)\tau_e(r)] = 0, |q-r| > \frac{2f_c}{B}. \quad (28)$$

Ignoring the roll-off effect of the correlation at each end of the sequences of zero-crossing samples, equation (23) therefore reduces to $$\sigma_{\tau_c}^2 = \frac{1}{4M^2} \frac{2f_c M}{B} E[\tau_e^2]. \quad (29)$$

Noting that the variance of the sample mean can be related to the variance of individual zero-crossing points by $$\sigma_\tau^2 = \frac{f_c \sigma_{\tau_e}^2}{2BM}. \quad (31)$$

Substituting equation (21) into (31) gives $$\sigma_\tau^2 = \frac{N_o}{C} \times \frac{1}{8MA_c^2 \pi^2 f_c}. \quad (32)$$

A conclusion from equation (32) is that the statistical variance of the time error derived from the samples is independent of the receive processor's bandwidth.

The rms (root-mean-square) measurement uncertainty in determining the one-way propagation delay to the target is therefore given by $$\tau_{rms} = \sqrt{\sigma_{\tau_c}^2} = \sqrt{\frac{N_o}{C} \times \frac{1}{8MA_c^2\pi^2 f_c}}. \quad (33)$$

Alternatively, the rms uncertainty can be described in terms of the ranging distance by using equations (3) and (33):

$$r_{rms} = v \times \sqrt{\frac{N_o}{C} \times \frac{1}{8MA_c^2\pi^2 f_c}} \text{ meters.} \quad (34)$$

Values provided by equation (34) have been verified by tests of the burst tone system on actual communication satellites; for example, using typical satellite link and burst tone parameters of $C/N_o$=65 dB, $f_c$=21 kHz, $A_c$=1 and M=10080 (for approximately 240 msec round-trip delay), equation (34) provides an rms range error result of 1.3 meters.

As described above the invention can be used for accurately determining the range of a signal retransmitting target device having significant signal bandwidth restrictions, even when the user lacks prior knowledge of the approximate target range. The disclosed invention may also be utilized for accurately determining the range of a fast moving target device. Additionally, the invention as described also minimizes range determination error caused by pre-calibration of ranging station components.

By applying background knowledge, those skilled in the art may readily adapt the disclosed invention to various applications without varying from the invention disclosed claimed herein. Such adaptations are and are intended to be covered within the meaning and range of equivalence of the following claims.

What is claimed:

1. A burst tone range processing system for determining the distance between a ranging station and a signal retransmitting target device, comprising:
   a signal generating means for generating a burst tone signal of finite duration;
   a transmitting means for transmitting said signal as a first transmitted burst tone signal along a delay transmission path from said ranging station to said target device and as a second transmitted burst tone signal along a reference transmission path within said ranging station;
   a receiving means for receiving said first transmitted burst tone signal from said target device and said second transmitted burst tone signal from said reference transmission path and for assigning time tags to said received signals;
   a time comparator means for correlating said received first and received second transmitted burst tone signals and for comparing said time tags assigned to said correlated signals.

2. A range processing system according to claim 1 further comprising a processing means for computing the distance between the ranging station and the target device based upon said time tag comparison.

3. A range processing system according to claim 1 wherein said target device has significant signal bandwidth restrictions.

4. A range processing system according to claim 3 wherein said target device is a communications satellite.

5. A range processing system according to claim 1 wherein said first and second transmitted burst tone signals are transmitted simultaneously and further comprising a translator means located on the reference transmission path for translating said second transmitted burst tone signal to facilitate reception by said receiving means, said translator means having known signal delay characteristics.

6. A range processing system according to claim 1 wherein said burst tone signal is comprised of a single burst having a duration of less than twice the distance between the ranging station and the target device divided by the speed of light.

7. A range processing system according to claim 6 wherein said burst tone signal is sinusoidal and is comprised of a preamble and a ranging tone.

8. A range processing system according to claim 7 wherein said preamble is comprised of at least two frequencies which are interleaved multiple times within said preamble and wherein said ranging tone is comprised of a single frequency equal to one of the preamble frequencies.

9. A range processing system according to claim 8 wherein the interleaved frequencies within the preamble transition at zero crossing of the sinusoidal burst tone signal and wherein the ranging tone immediately follows the preamble and transitions from the preamble at a zero crossing of the sinusoidal.

10. A range processing system according to claim 9 wherein each zero crossing of the received sinusoidal signals is time tagged.

11. A range processing system according to claim 10 wherein the correlation between the received first transmitted burst tone signal and the received second transmitted burst tone signal is determined based upon the sum of the root mean square differences between corresponding signal periods of the time tagged preamble sinusoid of the received first transmitted burst tone signal and the time tagged preamble sinusoid of the received second transmitted burst tone signal.

12. A range processing system according to claim 11 wherein the distance between the ranging station and the target device is determined using the average difference between the time tag assigned to each zero crossing of the ranging tone of the correlated first transmitted burst tone signal and the time tag assigned to the corresponding zero crossings of the ranging tone of the correlated second transmitted burst tone signal.

13. A range processing system according to claim 10 wherein each time tag is assigned based upon a linear interpolation of samplings on either side of a nominal zero crossing, sampled at a rate of at least 8 times the signal frequency.

14. A range processing system according to claim 7 further comprising a filter with a bandwidth approximately equal to the spectral power content of the preamble of the burst tone signal.

15. A range processing system according to claim 1, wherein said first transmitted burst tone signal and said second transmitted burst tone signal are modulated signals, and said receiving means demodulates said received first transmitted burst tone signal and second transmitted burst tone signal.

16. A burst tone range processing system for determining the distance between a ranging station and a signal re-transmitting target device, comprising:
   a signal generating means for generating a first burst tone signal of finite duration and an identical second burst tone signal;
   a transmitting means for first transmitting said first burst tone signal as a first transmitted signal along a delay transmission path from said ranging station to said target device and as a second transmitted signal along a reference transmission path within said ranging station and for next transmitting said second pulse tone signal as a third transmitted signal along said delay transmission path and as a fourth transmitted signal along said reference transmission path, wherein a time delay equal of no less than twice the maximum distance between the ranging station and the target device divided by the speed of light is introduced between the transmission of said first burst tone signal and the transmission of said second burst tone signal;
   a receiving means for receiving said first and third transmitted signals from said target device and said second and fourth transmitted signals from said reference transmission path and for assigning time tags to said received signals;
   a data storage means for storing at least a portion of the time tags assigned to the first and fourth, or alternatively the second and third, transmitted signals;
   a time comparator means for correlating said received first and received fourth transmitted signals, or alternatively said received second and received third transmitted signals, and for comparing the stored time tags assigned to said first and forth, or alternatively the second and third, correlated signals.

17. A range processing system according to claim 16 further comprising a processing means for computing the distance between the ranging station and the target device based upon said time tag comparison.

18. A ranging method for determining the distance between a ranging station and a signal re-transmitting target device, comprising the steps of:

generating a burst tone signal of finite duration;

transmitting said signal as a first transmitted burst tone signal along a delay transmission path from said ranging station to said target device and as a second transmitted burst tone signal along a reference-transmission path within said ranging station;

receiving said first-transmitted burst tone signal from said target device and said second transmitted burst tone signal from said reference transmission path and assigning time tags to said received signals;

correlating said received first and received second transmitted burst tone signals and comparing the time tags assigned to said correlated signals.

19. A ranging method according to claim 18, wherein said first transmitted burst tone signal and said second transmitted burst tone signal are modulated signals, and said step of receiving includes demodulating said received first transmitted burst tone signal and second transmitted burst tone signal.

20. A ranging method according to claim 18 further comprising the step of computing the distance between the ranging station and the target device based upon said time tag comparison.

21. A ranging method according to claim 18 wherein the transmission of said first and second transmitted burst tone signals occurs simultaneously and further comprising the step of translating said second transmitted burst tone signal to facilitate reception, said translating step causing a known signal delay.

22. A ranging method according to claim 18 wherein said burst tone signal is comprised of a single burst having a duration of less than twice the distance between the ranging station and the target device divided by the speed of light.

23. A ranging method according to claim 22 wherein said burst tone signal is sinusoidal and is comprised of a preamble and a ranging tone.

24. A ranging method according to claim 23 wherein said preamble is comprised of at least two frequencies which are interleaved multiple times within said preamble and wherein said ranging tone is comprised of a single frequency equal to one of the preamble frequencies.

25. A ranging method according to claim 24 wherein the interleaved frequencies within the preamble transition at zero crossing of the sinusoidal burst tone signal and wherein the ranging tone immediately follows the preamble and transitions from the preamble at a zero crossing of the sinusoidal.

26. A ranging method according to claim 24 wherein each zero crossing of the received sinusoidal signals is time tagged.

27. A ranging method according to claim 26 wherein the correlation between the received first and the received second transmitted burst tone signals is determined based upon the sum of the root mean square differences between corresponding signal periods of the time tagged preamble sinusoid of the received first transmitted burst tone signal and the time tagged preamble sinusoid of the received second transmitted burst tone signal.

28. A ranging method according to claim 27 wherein the distance between the ranging station and the target device is determined using the average difference between the time tag assigned to each zero crossing of the ranging tone of the correlated first transmitted burst tone signal and the time tag assigned to the corresponding zero crossings of the ranging tone of the correlated second transmitted burst tone signal.

29. A ranging method according to claim 26 wherein each time tag is assigned based upon a linear interpolation of samples on either side of a nominal zero crossing, sampled at a rate of at least 8 times the signal frequency.

30. A ranging method according to claim 23 further comprising the step of filtering the received signals through a filter with a bandwidth approximately equal to the spectral power content of the preamble of the burst tone signal.

31. A ranging method for determining the distance between a ranging station and a signal re-transmitting target device, comprising the steps of:

generating a first burst tone signal of finite duration and an identical second burst tone signal;

first transmitting said first burst tone signal as a first transmitted signal along a delay transmission path from said ranging station to said target device and as a second transmitted signal along a reference transmission path within said ranging station and next transmitting said second burst tone signal as a third transmitted signal along said delay transmission path and as a fourth transmitted signal along said reference transmission path, wherein a time delay equal of no less than twice the maximum distance between the ranging station and the target device divided by the speed of light is introduced between the transmitting of said first burst tone signal and the transmitting of said second burst tone signal;

receiving said first and third transmitted signals from said target device and said second and fourth transmitted signals from said reference transmission path and assigning time tags to said received signals;

storing a portion of the time tags assigned to the first and fourth, or alternatively the second and third, transmitted signals in a data base;

correlating said received first and received fourth transmitted signals, or alternatively said received second and received third transmitted signals, and comparing the stored time tags assigned to said first and fourth, or alternatively said second and third, correlated signals.

32. A ranging method according to claim 31 further comprising the step of computing the distance between the ranging station and the target device based upon said tag time comparison.

\* \* \* \* \*